US007664030B2

(12) United States Patent
Sugaya

(10) Patent No.: US 7,664,030 B2
(45) Date of Patent: Feb. 16, 2010

(54) RADIO COMMUNICATION SYSTEM, RADIO COMMUNICATION APPARATUS, RADIO COMMUNICATION METHOD, AND COMPUTER PROGRAM

(75) Inventor: Shigeru Sugaya, Kanagawa (JP)

(73) Assignee: Sony Corporation (JP)

( * ) Notice: Subject to any disclaimer, the term of this patent is extended or adjusted under 35 U.S.C. 154(b) by 1269 days.

(21) Appl. No.: 10/600,749

(22) Filed: Jun. 19, 2003

(65) Prior Publication Data

US 2004/0053621 A1    Mar. 18, 2004

(30) Foreign Application Priority Data

Jul. 5, 2002    (JP)    ............... P2002-197509

(51) Int. Cl.
*H04J 1/16* (2006.01)
*H04L 1/00* (2006.01)
*H04J 3/14* (2006.01)
*H04L 12/26* (2006.01)

(52) U.S. Cl. .................. 370/235; 370/328; 370/329
(58) Field of Classification Search ........... 370/235, 370/328
See application file for complete search history.

(56) References Cited

U.S. PATENT DOCUMENTS

| 5,412,659 A | * | 5/1995 | Fujita et al. | ............... | 370/337 |
| 5,577,168 A | * | 11/1996 | Haas et al. | ............... | 455/443 |
| 5,666,653 A | * | 9/1997 | Ahl | ............... | 370/330 |
| 5,778,318 A | * | 7/1998 | Talarmo et al. | ............... | 455/452.1 |
| 6,470,006 B1 | | 10/2002 | Moulsley et al. | | |
| 6,944,446 B1 | * | 9/2005 | Kubler et al. | ............... | 455/422.1 |
| 2002/0008085 A1 | | 1/2002 | Tsukamoto | | |
| 2003/0002456 A1 | * | 1/2003 | Soomro et al. | ............... | 370/328 |
| 2003/0169697 A1 | * | 9/2003 | Suzuki et al. | ............... | 370/310 |
| 2004/0058686 A1 | * | 3/2004 | Odman | ............... | 455/450 |

FOREIGN PATENT DOCUMENTS

| JP | 2001237839 | 8/2001 |
| JP | 2001358642 | 12/2001 |
| JP | 2002-500848 | 1/2002 |
| JP | 2002118875 | 4/2002 |
| JP | 2002-158667 | 5/2002 |
| JP | 2002185476 | 6/2002 |
| WO | WO02/41586 | 5/2002 |

* cited by examiner

*Primary Examiner*—Ayaz R Sheikh
*Assistant Examiner*—Blanche Wong
(74) *Attorney, Agent, or Firm*—Lerner, David, Littenberg, Krumholz & Mentlik, LLP

(57) ABSTRACT

A radio communication system, a radio communication apparatus, a radio communication method, and a computer program allow networks to be operated without interference between contending networks. When plural piconets collide on the same frequency channel, a control station of one of the piconets temporarily sets a buffer super frame period to maintain a coexistent relationship between the piconets. When an apparatus other than a control station receives a beacon signal of the buffer super frame period, a shorter super frame period based on that super frame period is temporarily set to make fine adjustment of the next beacon signal transmission timing. An apparatus that has not received a beacon signal looks for a beacon signal of its own piconet for a redundant time so as to find a start timing of a new super frame period.

19 Claims, 10 Drawing Sheets

FIG. 7

| Beacon Header 71 | Header Check 72 | Device Identifier 73 | Network Synchronization Parameters 74 | Max. Transmission Power Information 75 | Channel Time Allocation Element 76 | Frame Check 77 |

RADIO COMMUNICATION SYSTEM, RADIO COMMUNICATION APPARATUS, RADIO COMMUNICATION METHOD, AND COMPUTER PROGRAM

BACKGROUND OF THE INVENTION

1. Field of the Invention

The present invention relates to a radio communication system for effecting communication among a plurality of radio stations, a radio communication apparatus and a radio control method, and a computer program. Particularly, the present invention relates to a radio communication system in which a network is configured under the control of a particular control station, a radio communication apparatus and a radio communication method, and a computer program.

More particularly, the present invention relates to a radio communication system in which a plurality of wireless networks coexist, a radio communication apparatus and a radio communication method for controlling a communication operation in each wireless network in a communication environment wherein a plurality of wireless networks contends, and a computer program and, particularly to, a radio communication system, a radio communication apparatus and a radio communication method, and a computer program that are run, obviating interference among contending networks.

2. Description of the Related Art

A plurality of computers may be connected to constitute a local area network (LAN) to share information, such as files and data, and peripheral equipment, such as a printer, and to effect information exchange, including transfer of electronic mail and data contents.

Hitherto, LANs have generally been formed using optical fibers, coaxial cables, twist pair cables or other types of cables. This automatically requires line laying construction work that involves complicated cable routing, making it difficult for achieving easy configuration of networks. Furthermore, after configuring a LAN, equipment movable distances are inconveniently limited by cable lengths of the equipment. As a solution to this shortcoming, attention has been focused on a wireless LAN as a system for releasing users from the LAN wiring based on a conventional cable connection method. The wireless LAN makes it possible to obviate the need for most cables in a working area, such as an office, allowing communication terminals, such as personal computers (PCs) to be moved relatively easily.

With the recent trend toward increasing speed and lowering prices of wireless LANs, the demand for wireless LANs is markedly increasing. In particular, the introduction of a personal area network (PAN) is recently being discussed in order to effect information communication by configuring a small-scale wireless network for a plurality of electronic equipment installed around users. For instance, different radio communication systems are specified by using frequency bands not requiring permits by supervisory authorities, such as a 2.4 GHz band or a 5 GHz band.

According to, for example, IEEE802.15.3, activities for standardizing high-speed radio personal area networks exceeding 20 Mbps are being developed. According to the section, standardization based on a PHY layer mainly using 2.4 GHz-band signals is being promoted.

In this type of wireless personal network, one radio communication apparatus acts as a control station known as a "coordinator." A personal area network is formed within 10 meters, centering around the coordinator. The coordinator transmits a beacon signal at a predetermined interval, and the beacon interval is defined as a transmission frame period. A time slot used by each radio communication apparatus is allocated for each transmission frame period.

For allocating time slots, a method known as, for example, "guaranteed time slot" (hereinafter referred to as "GTS") is used. This is a communication method whereby transmission bands are dynamically allocated while guaranteeing a predetermined transmission capacity at the same time.

For example, a contention access period (hereinafter referred to as "CAP") and a contention free period (hereinafter referred to as "CFP") are prepared for a MAC layer specified by IEEE802.15.3. To effect asynchronous communication, a CAP is used to exchange short data or command information. To effect stream communication, dynamic time slot allocation based on a GTS is carried out in a CFP so as to perform channel time reservation transmission.

The MAC layer standardized by IEEE802.15.3 is specified such that it conforms to the standard specifications of other PHY layers in addition to a PHY layer using 2.4 GHz band signals. Moreover, standardization efforts are being started to use other PHY layers in addition to PHY layers using 2.4 GHz band signals for the PHY layer standardized by IEEE802.15.3.

Also recently, wireless LAN systems to which a spread spectrum diffusion (SS) method has been applied are being put in practical use. Furthermore, an ultra-wide band (UWB) transmission method has been proposed for a PAN or similar applications.

According to direct spread (DS) method, which is a kind of the SS method, a transmitting end multiplies an information signal by a random coding sequence called a "pseudo noise" (PN) code so as to spread an occupied band and transmits it, whereas a receiving end multiplies the received spread information signal by a PN code so as to effect reverse diffusion, thereby reproducing the information signal.

In the UWB, an impulse signal sequence of an extremely short period of about a few hundred picoseconds is used to produce an information signal to transfer the signal sequence. The occupied band width is equivalent to a band of a GHz order such that the value obtained by dividing the occupied band width by its central frequency (e.g., 1 GHz to 10 GHz) is approximately 1. The occupied band is an ultra-wide band, as compared with a band width normally used for a wireless LAN that employs the "W-CDMA" or cdma2000 method, the SS method or the orthogonal frequency division multiplexing (OFDM) method.

In a recent communication environment wherein information equipment typically represented by PCs has been disseminated and a number of equipment exists in an office in a mixed fashion, all the equipment being connected through wireless networks, a case may be observed where a small working environment is crowded with two or more wireless networks and a plurality of wireless networks coexists in the same frequency band. The "same frequency band" in this case includes the UWB radio communication method in which data is diffused over an extremely broad frequency band to transfer the data.

Especially in the case of a UWB radio communication network, it is highly probable that neighbor radio communication networks contend, since data is diffused over an extremely broad band to transfer data.

Meanwhile, an impulse signal sequence used in a UWB radio communication system does not have any particular frequency carriers, making it difficult to effect carrier sensing. Hence, if the UWB radio communication system is applied to the PHY layer in IEEE802.15.3, therefore, the absence of any particular carrier signals makes it impossible to conduct access control by using the carrier sensing standardized in the foregoing section. Hence, there is no other alternative but to depend on access control based on time division multiplexing.

In case of a small-scale wireless network system, such as a PAN, the existence of each network or a base station is not necessarily secured. Hence, it is required to solve the problem of contention among networks and to accomplish dynamic allocation of bands or resources when a new network is added in the same space or a network is brought in from another place.

According to the specifications of the PHY layer utilizing 2.4 GHz-band signals standardized by IEEE802.15.3 described above, a plurality of other radio communication systems exist in the same frequency band; therefore, the possibility of coexistence with such systems must be considered. According to the standardized network construction, the use of neighbor piconets is conceivable, in which control stations (hereinafter referred to as "PNCs") of networks operate the piconets, avoiding interference with each other. More specifically, specifications have been prepared on an assumption that an additional piconet is formed in the same space while an existing control station is transmitting a beacon signal.

The method for operating neighbor piconets standardized in IEEE802.15.3 specifies the use of a pseudo-static GTS to achieve coexistence of its own piconet and an associated piconet.

Thus, according to a conventional method, to create neighbor piconets, a plurality of piconets can be operated on the same frequency by disposing their beacons in ranges that are apart from each other.

In a PAN, however, moving a piconet automatically involves creation of another neighbor piconet, making it impossible to avoid overlapping beacon positions between neighbor piconets.

Furthermore, if neighbor piconets happen to share the same transmission period and transmission timing of a beacon signal, then radio communication apparatuses or devices existing in the two piconets cannot detect beacons from a control station, utterly disabling the operation of the piconets. The control station of course does not receive any signals while it is transmitting a beacon signal, so that it cannot detect by itself that its own beacon signal is colliding with another beacon signal.

In addition, according to the specifications in IEEE802.15.3, a device that can no longer receive a beacon signal will not be capable of identifying a frame structure described in the beacon signal, so that it can no longer transmit its information. Thus, there is no means for a device other than the one acting as the control station to send information to the control station.

The method for operating neighbor piconets according to the specifications in IEEE802.15.3 uses a pseudo-static GTS; hence, the allocation of a GTS once set may be changed by a command issued by a control station of a parent piconet.

SUMMARY OF THE INVENTION

The present invention has been made with a view toward solving the technological problems described above, it is an object of the present invention to provide an outstanding radio communication system, radio communication apparatus and radio communication method, and computer program that allow a plurality of networks configured under the control a particular control station to ideally coexist.

Another object of the present invention is to provide an outstanding radio communication system, radio communication apparatus and radio communication method, and computer program that permit operation to be performed, obviating interference among contending networks.

Yet another object of the present invention is to provide an outstanding radio communication system, radio communication apparatus and radio communication method, and computer program that allow networks to be ideally operate even if the transmission periods and transmission timings of beacon signals from neighbor networks overlap, causing radio communication apparatuses existing in both networks to be incapable of detecting beacons.

To these ends, according to a first aspect of the present invention, there is provided a radio communication system having a plurality of wireless networks, each wireless network including a plurality of radio communication apparatuses and a control station allocating a resource to each radio communication apparatus, wherein, upon detection of interference between networks, a buffer frame period that is different from a normal transmission frame period is set in one of the networks so as to adjust a positional relationship of frame periods used by the networks.

The term "system" used herein refers to a logical assembly of a plurality of devices or functional modules for implementing a particular function. The devices or functional modules may or may not be in a single housing.

The radio communication system according to a first aspect of the present invention makes it possible to perform fine adjustment of a frame period by using once or temporarily a buffer frame period that is different from a predetermined frame period when a transmission frame period is shared among wireless networks adjacently existing on the same channel. This allows operational synchronization to be easily accomplished in relation to other wireless networks.

Hence, the radio communication system according to the first aspect of the present invention makes it possible to accomplish synchronization with neighbor wireless networks so as to obviate overlapping of CFPs thereof or to obviate collision of beacon information, thus permitting a good neighbor network relationship to be established.

In the radio communication system according to the first aspect of the present invention, by temporarily providing a buffer superframe, it is possible to establish a neighbor piconet relationship with another piconet even while a piconet conforming to IEEE802.15.3 is in operation.

Furthermore, even if the position of a pseudo-static GTS allocated to a child piconet according to an instruction from a control station of a parent piconet changes, temporarily providing a buffer superframe period allows the child piconet to be synchronized with the parent piconet.

According to a second aspect of the present invention, there is provided a radio communication apparatus or a radio communication method for a control station to operate in a radio communication environment wherein a plurality of wireless networks operating under control of the control station coexists, including a beacon transmission device or step for setting a transmission frame period of a local network and transmitting beacon information regarding resource allocation at a predetermined position of the transmission frame period, an interference detection device or step for detecting whether the local network interferes with another network, and a buffer frame period setting device or step for setting a buffer frame period having a different frame period to change the position of a transmission frame period upon detection of interference between networks.

Alternatively, the interference detection device or step may detect interference of beacon information on the basis of parameters obtained by receiving beacon information transmitted from another network. For example, the interference detection device or step may detect whether CFPs are synchronized among networks on the basis of parameters obtained by receiving beacon information transmitted from another network.

In such a case, the buffer frame setting device or step may set a buffer frame period that is shorter than a normal transmission frame period to lessen the interference of CFPs among networks, thus permitting easy synchronization of transmission frame periods to be accomplished among networks.

Alternatively, the interference detection device or step may detect interference among networks on the basis of information from a radio communication apparatus in the local network.

In such a case, the buffer frame setting device or step may set a buffer frame period that is shorter than a normal transmission frame period to ease a collision of beacon information transmission positions among networks, thus permitting synchronization of transmission frame periods to be accomplished among networks so as to obviate collision of beacon information.

In other words, a radio communication apparatus acting as a control station may receive information on the existence of another wireless network and make fine adjustment of a transmission frame period of a local network thereby to implement coexistence of a plurality of wireless networks on the same frequency.

Thus, according to the radio communication apparatus or method in accordance with the second aspect of the present invention, in a case where a transmission frame period is shared among neighbor wireless networks existing on the same channel, fine adjustment of a frame period can be made by using a buffer frame period that is different from a predetermined frame period once or temporarily. This arrangement makes it possible to easily accomplish operational synchronization with other wireless networks. More specifically, it is possible to achieve synchronization so as to obviate overlapping of CFPs of neighbor wireless networks or to obviate collision of beacon information, thus allowing a good neighbor network relationship to be established.

According to a third aspect of the present invention, there is provided a radio communication apparatus or a radio communication method operating in a particular wireless network in a radio communication environment wherein a plurality of wireless networks operating under control of a control station coexists, including a beacon information receiving device or step for receiving beacon information from a control station of a local network in a predetermined beacon information receiving range, a beacon information detecting device or step for detecting beacon information from a control station of another network, a collision detecting device or step for detecting whether beacon information of a local network collides with beacon information of another network, and an interference informing device or step for notifying a control station of the local network of a beacon information collision detection result.

Alternatively, the beacon information detecting device or step may set a redundant time for a beacon information receiving range to detect beacon information from a control station of another network.

Alternatively, the interference informing device or step may report a beacon information collision detection result by using a management time slot allocated to a control station of the local network.

If a transmission frame period is shared among networks, collision of their beacon signals may collide. A control station does not perform a receiving operation during the transmission of a beacon signal, so that it cannot detect by itself that its beacon signal is colliding with another beacon signal.

This above problem has been solved by the radio communication apparatus or the radio communication method in accordance with the third aspect of the present invention, which makes it possible to notify a control station of colliding beacon signals. For instance, the existence of another wireless network located at a position hidden from a control station can be reported to the control station. As a result, a control station incapable of detecting collision can coexist with other networks by making fine adjustment of a transmission frame period.

According to a fourth aspect of the present invention, there is provided a computer program described in a computer-readable format so as to carry out, on a computer system, processing for a control station to operate in a radio communication environment wherein a plurality of wireless networks operating under the control of a control station coexist, including a beacon transmitting step for setting a transmission frame period of a local network and transmitting beacon information regarding resource allocation at a predetermined position of the transmission frame period, an interference detection step for detecting whether the local network interferes with another network, and a buffer frame period setting step for setting a buffer frame period having a different frame period to change the position of a transmission frame period upon detection of interference between networks.

According to a fifth aspect of the present invention, there is provided a computer program described in a computer-readable format so as to carry out, on a computer system, processing for an operation in a particular wireless network in a radio communication environment wherein a plurality of wireless networks operating under the control of a control station coexist, including a beacon information receiving step for receiving beacon information from a control station of a local network in a predetermined beacon information receiving range, a beacon information detection step for detecting beacon information from a control station of another network, a collision detection step for detecting whether beacon information of the local network collides with beacon information of another network, and an interference informing step for notifying a control station of the local network of a beacon information collision detection result.

The computer program according to the fourth or fifth aspect of the present invention defines a computer program described in a computer-readable format so as to carry out predetermined processing on a computer system. In other words, by installing the computer program according to the fourth or fifth aspect of present invention in a computer system, cooperative action is effected on the computer system to provide advantages similar to those obtained by the radio communication apparatus or the radio communication method according to the second or third aspect of the present invention.

Further objects, characteristics, and advantages of the present invention will be made apparent from further detailed explanation to be given in conjunction with a preferred embodiment of the invention to be described hereinafter and the accompanying drawings.

BRIEF DESCRIPTION OF THE DRAWINGS

FIG. 7 schematically shows a frame configuration of beacon information used in the wireless network according to the embodiment;

DESCRIPTION OF THE PREFERRED EMBODIMENTS

An embodiment in accordance with the present invention will now be explained with reference to the accompanying drawings.

Figure 1:
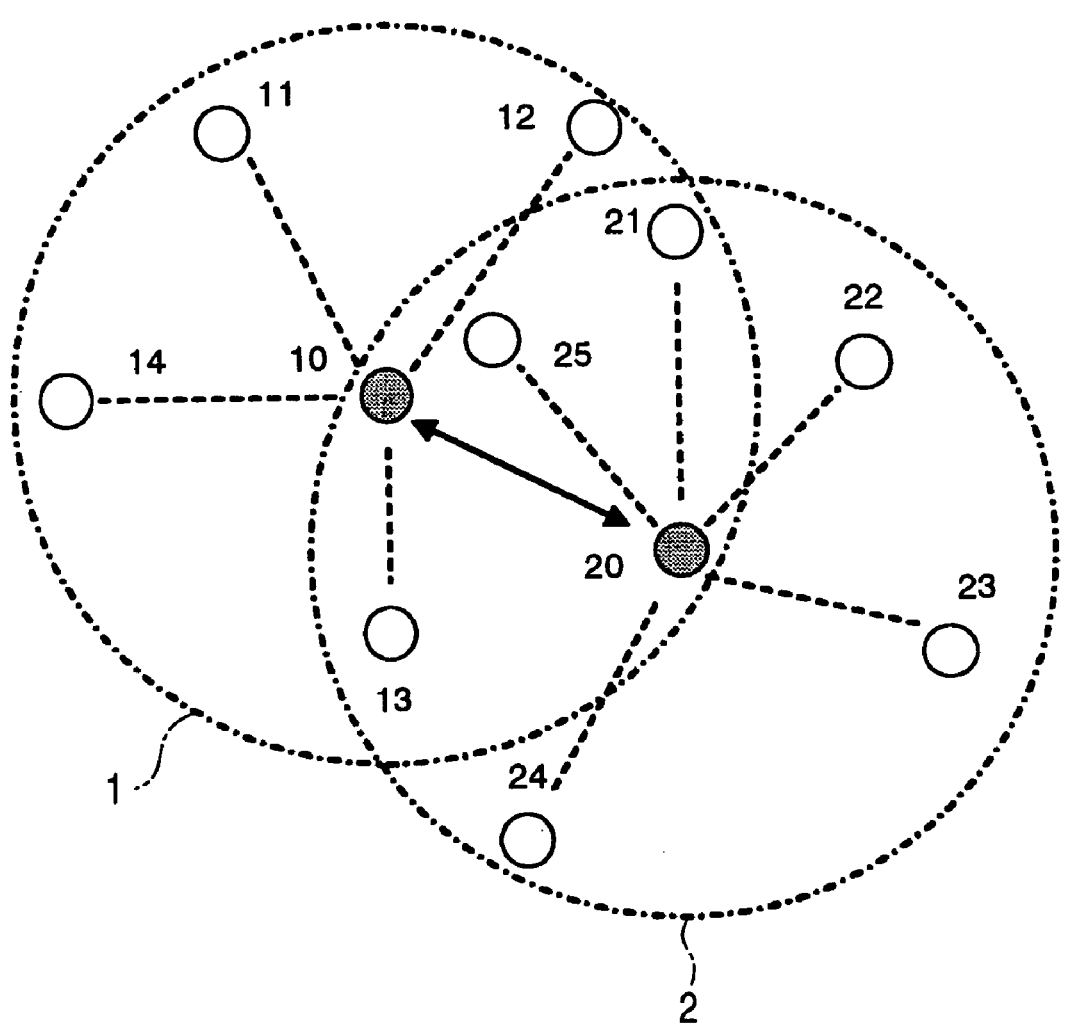
FIG. 1 shows an example of a plurality of networks existing in the same space.

FIG. 1 shows a plurality of networks existing in the same space.

In the example shown in FIG. 1, a first piconet 1 is constructed of radio communication apparatuses 11 through 14 centering around a radio communication apparatus 10 acting as a control station (hereinafter referred to as a "PNC").

Similarly, a second piconet 2 is constructed of radio communication apparatuses 21 through 25 centering around a radio communication apparatus 20 acting as a PNC.

In this example, the control station apparatuses (PNCs) 10 and 20 of both piconets and the radio communication apparatuses 13, 21 and 25 are disposed at positions where the overlapping of piconets can be detected. Moreover, the PNCs 10 and 20 of both piconets exist at positions where they can communicate with each other. This makes it possible to establish a relationship of neighbor piconets described in the specifications of IEEE 802.15.3.

Figure 2:
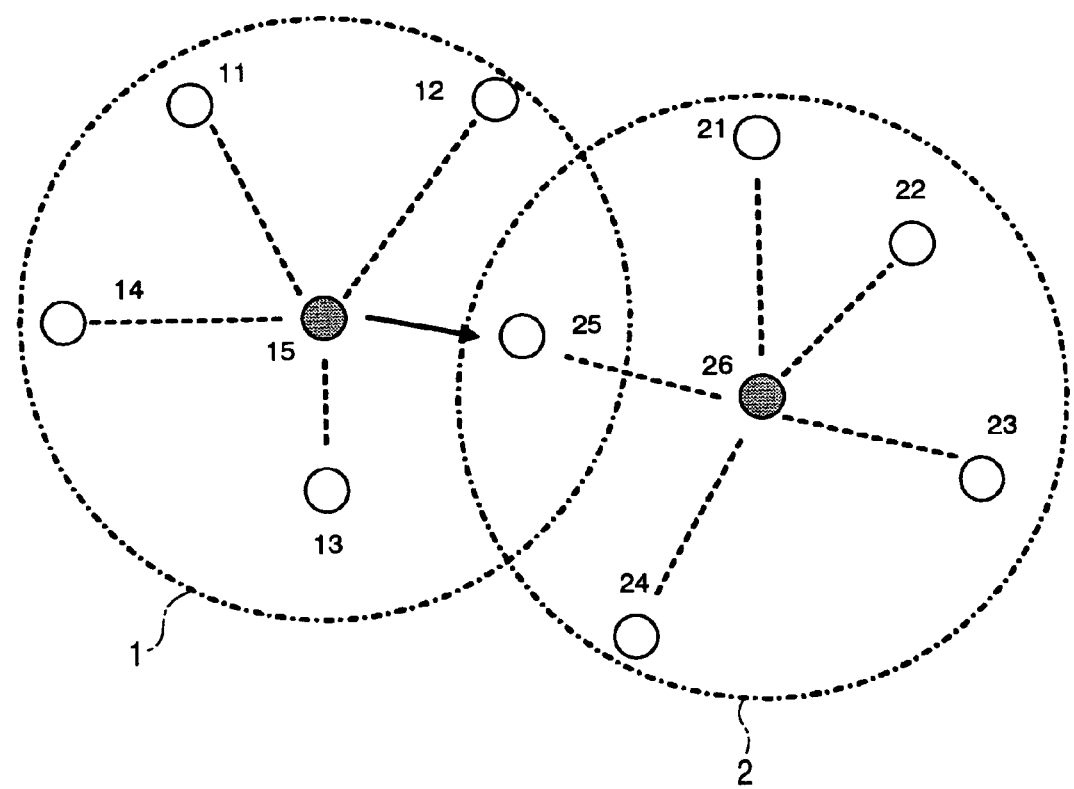
FIG. 2 shows another example of a plurality of networks existing in the same space.

FIG. 2 shows another example wherein a plurality of networks exist in the same space.

In the example shown in FIG. 2, a first piconet 1 is constructed of radio communication apparatuses 11 through 14 centering around a radio communication apparatus 10 acting as a PNC.

Similarly, a second piconet 2 is constructed of radio communication apparatuses 21 through 25 centering around a radio communication apparatus 20 acting as a PNC.

In this example, the radio communication apparatus 25 of the second piconet is disposed at a position where it can detect overlapping between piconets. The PNCs 10 and 20 of both piconets cannot communicate with each other, making it impossible to establish the neighbor piconet relationship described in IEEE 802.15.3.

The wireless network in this example effects radio data communication using, for instance, the UWB transmission method. The UWB radio communication network transfers data by spreading the data over an extremely broad band, leading to a high possibility of contention with a neighbor wireless communication network. An impulse signal sequence used in the UWB radio communication method does not have any particular frequency carrier, making carrier sensing difficult. For this reason, access control is carried out by time division multiplexing.

Figure 3:
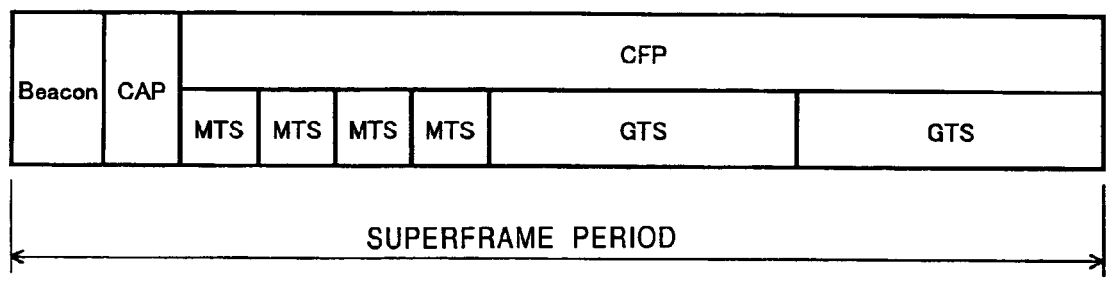
FIG. 3 schematically shows a configuration of a superframe period used in a personal area network complying with IEEE802.15.3.

FIG. 3 is a diagram schematically showing a configuration of a superframe period used in a personal area network complying with IEEE802.15.3.

As shown in FIG. 3, a beacon determines a superframe period. The beacon is followed by a CAP and a CFP.

The CAP specifies that asynchronous radio communication using a random access mechanism based on, for example, CSMA/CA is being effected.

As necessary, for each superframe, the CFP includes a management time slot (hereinafter referred to as an "MTS") for exchanging commands between a communication apparatus acting as a PNC and the remaining communication apparatuses in a network, and a slot for effecting channel time reservation/allocation communication called "guaranteed time slot (GTS)." In the PAN conforming to IEEE802.15.3, the superframe period shown in FIG. 3 is repeatedly used to operate the network.

Figure 4:
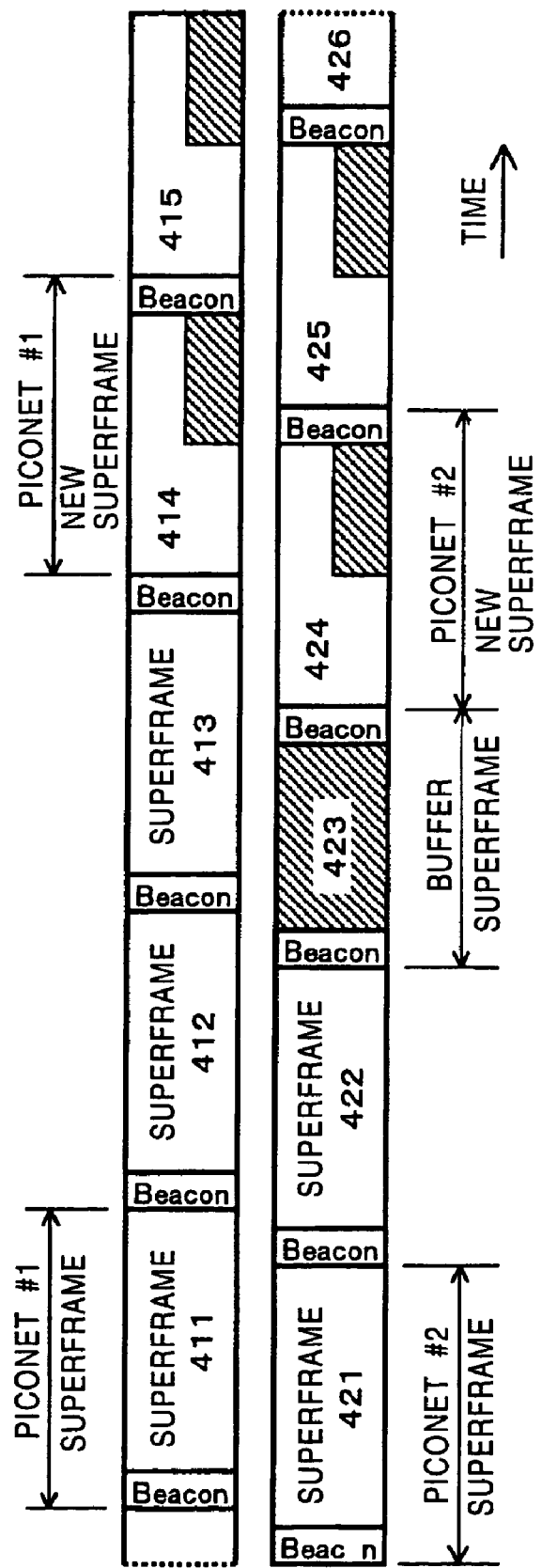
FIG. 4 schematically shows an arrangement example of buffer superframes used in a wireless network according to an embodiment of the present invention.

FIG. 4 schematically shows an arrangement example of buffer superframes used in a wireless network according to the present embodiment. The example shows the relationship between the first piconet and the second piconet that happen to exist adjacently to each other.

As illustrated, superframe periods 411 and 412 of the first piconet and superframe periods 421 and 422 of the second piconet are not synchronized with each other.

In this example, therefore, the PNC of the second piconet that has detected the synchronization failure temporarily provides a buffer superframe 423 to establish a neighbor piconet relationship. More specifically, the time equivalent to exactly half the superframe period 413 of the first piconet is used to set a superframe period that is momentarily shorter for the buffer superframe period of the second piconet. The PNC of the second piconet sets a superframe period 424 of the second piconet immediately following the buffer superframe period.

At this time, the PNC of the second piconet sets the GTS indicated by hatching in FIG. 4 so as to cause the first piconet to act as a neighbor piconet.

In response, the PNC of the first piconet sets the GTS, which is indicated by hatching in FIG. 4, in a superframe period 414 of the first piconet so as to cause the second piconet to act as a neighbor piconet.

Thereafter, as in the case of a superframe period 415 of the first piconet and a superframe period 425 of the second piconet, setting GTS allows the both piconets to operate as neighbor piconets.

Figure 5:
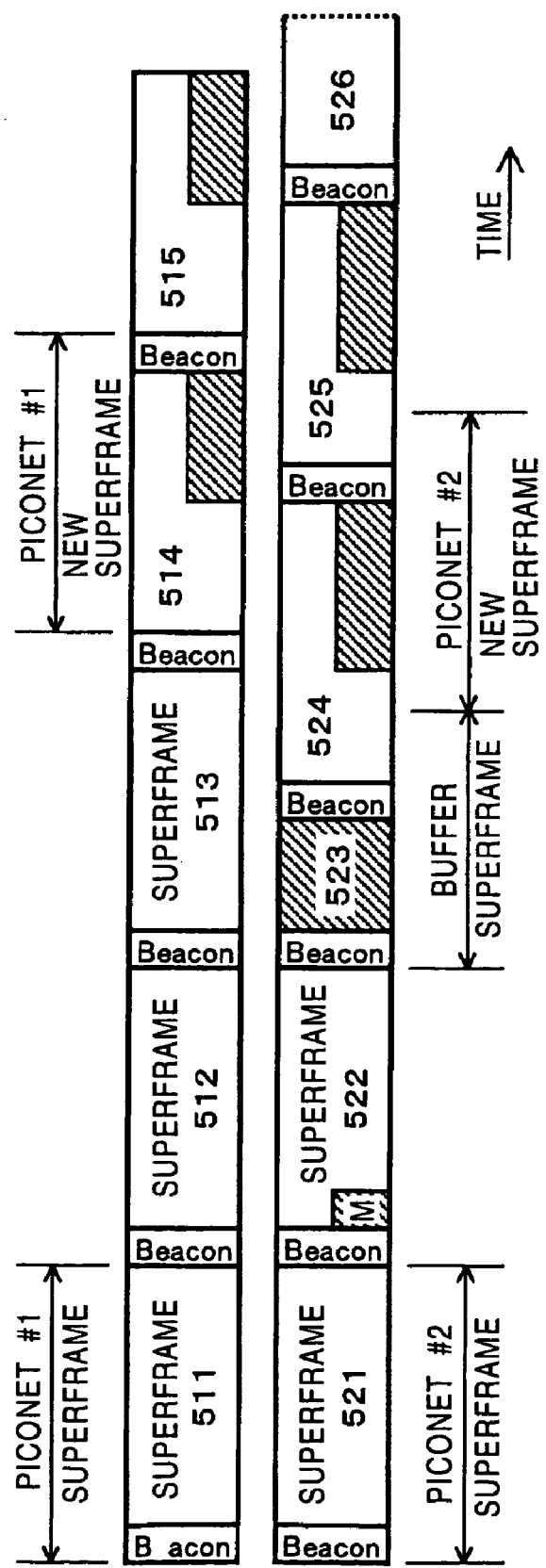
FIG. 5 illustrates an operation for reporting a collision of beacon signals by using management time slots in the wireless network according to the embodiment.

FIG. 5 illustrates an operation for reporting a collision of beacon signals by using management time slots in a wireless network according to the embodiment. In the example, however, shows a relationship of the first piconet and the second piconet that adjacently exist.

As illustrated, a superframe period 511 of the first piconet and a superframe period 521 of the second piconet coincide with each other.

In this example, if a communication apparatus included in the second piconet that has detected a beacon collision notifies a PNC of the second piconet by using a management time slot M.

The PNC of the second piconet that has been informed of the beacon collision through the management time slot M temporarily provide a buffer superframe 523 so as to establish a neighbor piconet relationship. More specifically, a shorter superframe period is instantaneously set so as to set the time equivalent to exactly half a superframe period 513 of the first piconet serves as a buffer superframe period of the second piconet. Then, immediately thereafter, the PNC of the second piconet sets a superframe period 524 of the second piconet.

At this time, the PNC of the second piconet sets a GTS indicated by hatching so that the first piconet operates as a neighbor piconet.

In response, the PNC of the first piconet sets a GTS indicated by hatching in the drawing such that the second piconet acts as a neighbor piconet by a superframe period 514 of the first piconet.

Thereafter, as in the case of a superframe period 515 of the first piconet and a superframe period 525 of the second piconet, setting the GTS allows the both piconets to operate as neighbor piconets.

Figure 6:
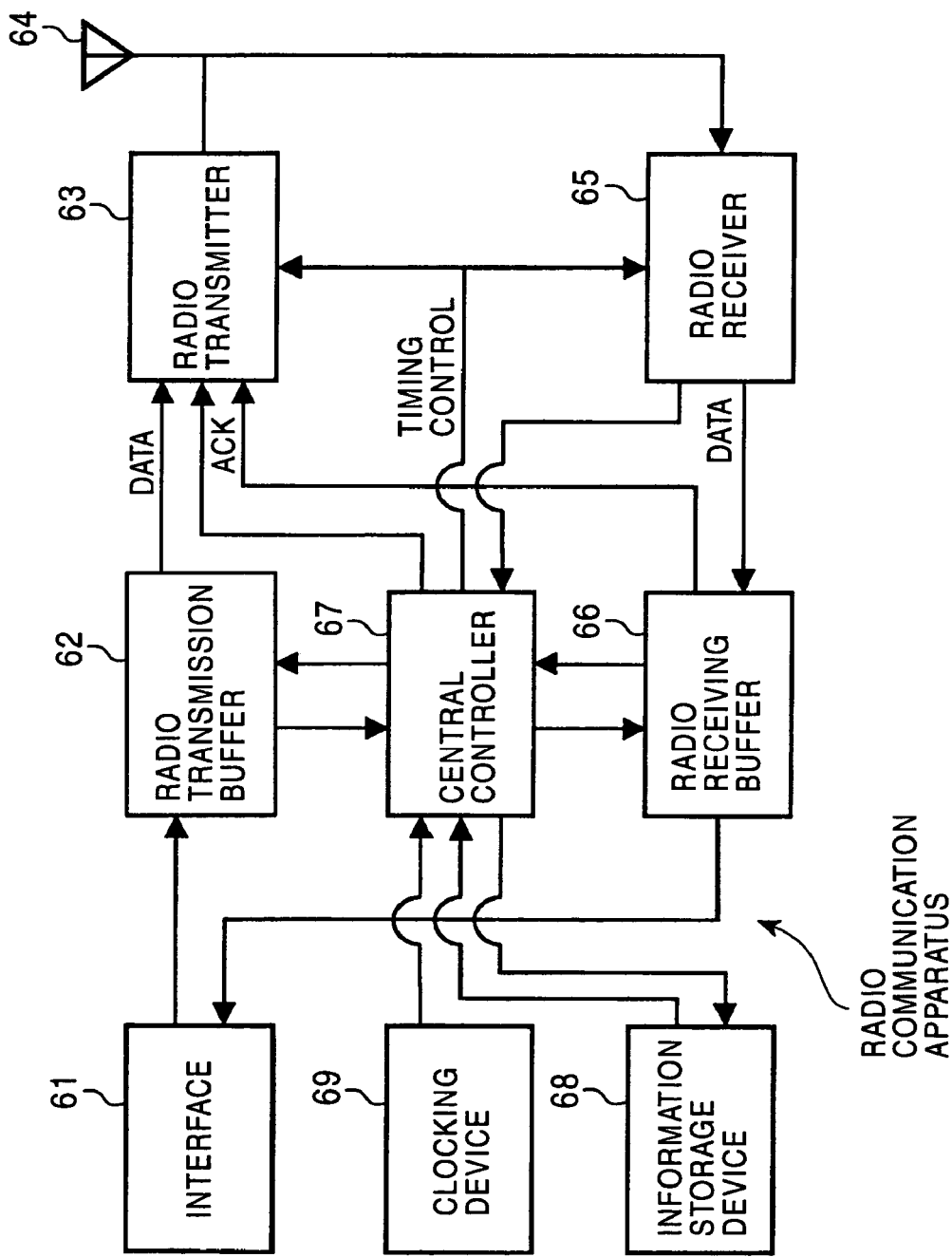
FIG. 6 schematically shows a functional construction of a radio communication apparatus that can be operated in the wireless network according to the embodiment.

FIG. 6 schematically shows a functional construction of a radio communication apparatus that can be operated in the wireless network according to the embodiment.

Referring to FIG. 6, the radio communication apparatus is constructed of an interface 61 for exchanging information with equipment or application device connected to the apparatus, a radio transmission buffer 62 for storing information received from the application device through the intermediary of the interface 61, a radio transmitter 63 for encoding stored information into data to be radio-transmitted and carrying out various types of signal processing, an antenna 64 for transmitting signals created by the radio transmitter 63 to a medium or receiving signals from the medium, a radio receiver 65 for receiving signals transmitted to the medium through the antenna 64 and for further converting the signals into information, and a radio receiving buffer 66 for storing the converted information and correctly collecting information to supply it to the interface 61. The radio communication apparatus further includes a central controller 67 for controlling a series of the above operations and sequentially carrying out processing in the wireless network, an information storage device 68 for storing the series of the operations as a predetermined execution instruction program and for storing necessary information, and a clocking device 69 that counts timings for actuating the radio transmitter 63 or the radio receiver 65 according to instructions received from the central controller 67.

The radio communication apparatus is further provided with a function to be a PNC. More specifically, an execution instruction program is stored beforehand in the information storage device 68 if it is necessary to act as a PNC, or otherwise, it acts as a general radio communication apparatus.

A radio communication apparatus acting as a PNC generates beacon information in the central controller 67 and transmits the generated information as a beacon signal from the radio transmitter 63 according to the timing of a predetermined superframe period from the clocking device 69, thereby operating the wireless network.

A non-PNC radio communication apparatus receives the beacon signal from the PNC through the radio receiver 65 according to an instruction from the clocking device 69 according to a preset superframe period timing. Based on the beacon information, the superframe period is set, and performs a wireless network operation subordinate to the PNC.

These radio communication apparatuses are constructed to operate according to a predetermined access control method. In the range of the MTS of the superframe period, each radio communication apparatus can transmit command information to the PNC. In other words, the PNC performs the receiving operation in the MTS range to receive command information from each radio communication apparatus.

As the commands to be exchanged in the MTS, there are prepared commands, including a command for reserving a GTS for transmitting channel time reservations in a CFP, and a command for notifying the existence of another wireless network in neighborhood.

FIG. 7 schematically shows a frame configuration of beacon information used in a wireless network according to the embodiment.

Referring to FIG. 7, a beacon information frame includes header information or a beacon header 71 denoting a beacon signal, a header check sequence or a header check 72 for checking for an error of the header information, information for identifying a communication apparatus or device operating a network or a device identifier 73, synchronizing parameter information 74 necessary to operate a network, maximum transmission power information 75 indicating maximum transmission power in a network, information regarding band reservation communication allocation of a CFP or a channel time allocation element 76, and a frame check sequence or frame check 77 for checking for an error in the frame information.

Figure 8:
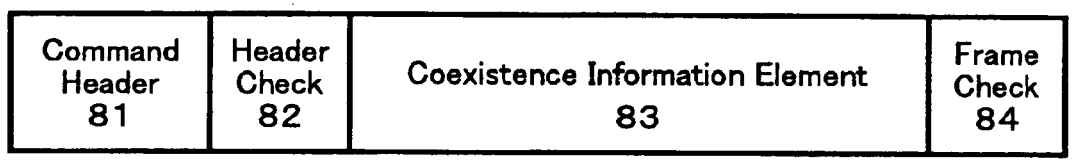
FIG. 8 schematically shows a configuration of an interference information command frame exchange in a management time slot in the wireless network according to the embodiment.

FIG. 8 schematically shows a configuration of an interference information command frame exchanged in a management time slot.

Referring to FIG. 8, the interference information command frame is formed of header information (Command Header) 81, a header check sequence (Header Check) 82 for checking for an error in header information, interference information element (Coexistence Information Element) 83 describing parameters for reporting interference from another wireless network, and a frame check sequence (Frame Check) 84 for checking for an error in the frame information.

Figure 9:
FIG. 9 schematically shows a configuration of a command frame of a reservation request signal used by a radio communication apparatus to request a channel time reservation from a control station in the wireless network according to the embodiment.

FIG. 9 schematically shows a configuration of a command frame of a reservation request signal used by a radio communication apparatus to request a channel time reservation from a PNC in the wireless network according to the embodiment.

Referring to FIG. 9, the command frame of a reservation request signal is formed of header information (Command Header) 91 denoting that it is a command requesting for reservation, a header check sequence (Header Check) 92 for checking for an error in header information, a channel time reservation information element describing parameters for requesting channel time reservation (Channel Time Request Block) 93, and a frame check sequence (Frame Check) 94 for checking for an error in the frame information.

Figure 10:
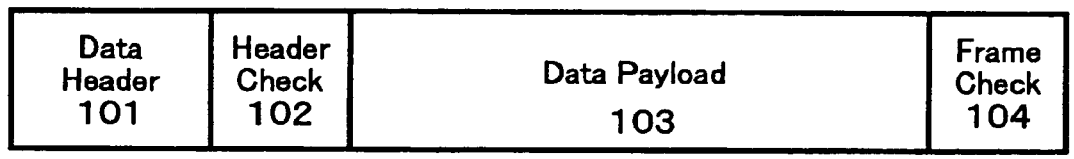
FIG. 10 schematically shows a configuration of a data information frame actually used for transferring data among radio communication apparatuses in the wireless network according to the embodiment.

FIG. 10 schematically shows a configuration of a data information frame actually used for transferring data among radio communication apparatuses in the wireless network according to the embodiment.

Referring to FIG. 10, the data information frame is formed of header information (Data Header) 101 indicating that it is data, a header check sequence (Header Check) 102 for checking for an error in header information, information data payload (Data Payload) 103 indicating actual user data, and a frame check sequence (Frame Check) 104 for checking for an error in the frame information.

Figure 11:
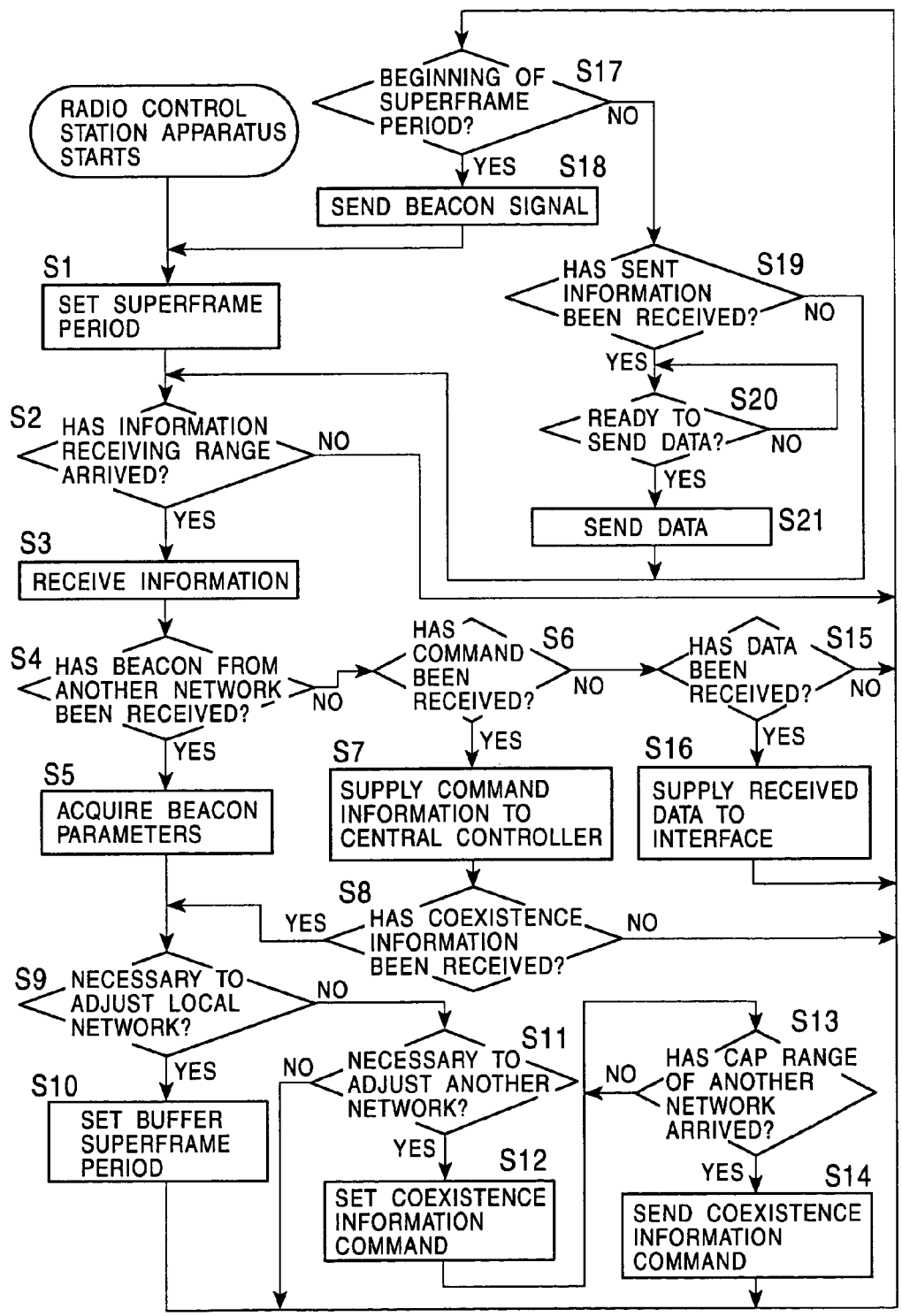
FIG. 11 is a flowchart showing an operation procedure carried out by a radio communication apparatus acting as a control station in the wireless network according to the embodiment.

FIG. 11 is a flowchart showing an operating procedure carried out by a radio communication apparatus acting as a PNC in the wireless network according to the embodiment. The operating procedure is actually carried out by the central controller 67 implementing a program code stored in the information storage device 68.

First, a superframe period of the wireless network is set in step S1.

Then, it is determined in step S2 whether information receiving range has been reached. If the determination result is affirmative, then processing for receiving the information is carried out in step S3. In this case, the receiving operation may be performed for a predetermined redundant time to determine whether any other neighbor wireless network exists.

Subsequently, it is determined in step S4 whether a beacon signal from another wireless network has been received. If it is determined that a beacon signal (refer to FIG. 7) has been received, then parameters of primarily a CAP and a CFP described in the beacon signal are acquired in step S5. Then, the program proceeds to subsequent step S9.

If no beacon signal has been received from another network in the information receiving range, then it is checked in step S6 whether a command directed to its own station has been received.

If it is determined that a command has been received in the information receiving range, then the central controller 67 is notified of the command information in step S7 and the command information is processed. Furthermore, it is determined in step S8 whether the command is interference information (refer to FIG. 8), and if it turns out to be interference information, then the program proceeds to step S9.

In step S9, it is determined whether adjustment of a superframe period of a local network is necessary. This is implemented by, for example, determining the positional relationship between a superframe period of the local network and a superframe period of another network.

If it is determined that the superframe period of the local network need to be adjusted, then a buffer superframe period is temporarily set in its own superframe period, then processing for transmitting a beacon signal defining the buffer superframe period is carried out in step S18 via step S17.

Meanwhile, if it is determined in step S9 that the adjustment of the superframe period of the local network is unnecessary, then it is further determined in step S11 whether the adjustment of a superframe period of another network is necessary. This is implemented by, for example, determining a network to be adjusted on the basis of the difference in network ID between the local network and another network.

If another network requires the adjustment of its superframe period, then the interference information command (refer to FIG. 8) is created in step S12. The program then waits in step S13 for the arrival of a CAP range of another network, and transmits a pertinent interference information command according to a predetermined access control procedure in step S14. Thereafter, the program proceeds to step S17.

If it is determined in step S6 that no command has been received in the information receiving range, then it is further determined in step S15 whether data has been received. If it is determined that data has been received (refer to FIG. 10), then the data is stored in a radio receiving buffer 66, and the received data is reported to the interface 61 in step S16. Then, the program proceeds to step S17.

If it is determined in step S2 that the information receiving range has not been reached, or if it is determined in step S8 that the received command is not interference information, then the program sets a buffer superframe period in step S10, and proceeds to step S17 to determine whether the leading timing of the superframe period of a local network has been reached. If it is determined in step S11 that the adjustment of another network is unnecessary, then the program transmits an interference information command to another network in step S14 or notifies the interface 61 of the received data, and proceeds to step S17 to determine whether the leading timing of the superframe period of the local network has been reached.

Only when the aforesaid timing arrives, a beacon signal stored in advance is transmitted in step S18, then the program proceeds to step S1 to set a predetermined superframe period and repeatedly carry out the same series of steps described above.

If it is determined in step S17 that the leading timing of the superframe period has not arrived, then it is further determined in step S19 whether the information to be wirelessly transmitted from the interface 61 has been received by the radio transmission buffer 62.

If the information to be wirelessly transmitted is received, then it is determined in step S20 whether the timing permits data transmission. If the timing that permits data transmission arrives, then processing for transmitting data is carried out in step S21.

Even if no information to be wirelessly transmitted has been received, the program proceeds to step S2 thereafter to carry out processing for receiving information in an information receiving range, repeatedly carrying out the same series of steps described above.

Figure 12:
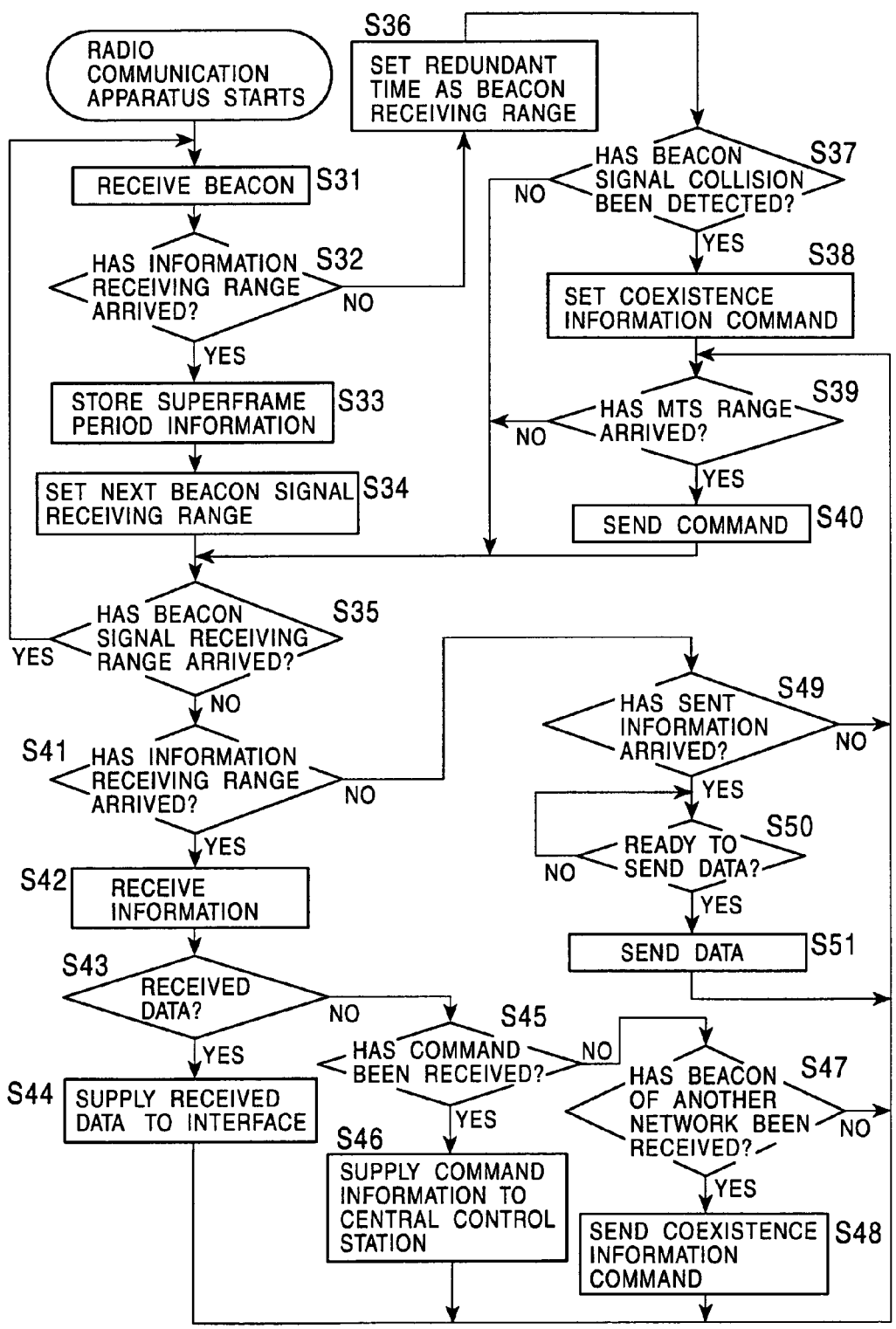
FIG. 12 is a flowchart showing an operation procedure carried out by a radio communication apparatus operating subordinately to a control station in the wireless network according to the embodiment.

FIG. 12 is a flowchart showing an operation procedure carried out by a radio communication apparatus operating as a general terminal station in the wireless network according to the embodiment. The operating procedure is actually carried out by the central controller 67 implementing a program code stored in the information storage device 68.

First, processing for receiving a beacon signal from a PNC of the wireless network is carried out in step S31. In this case, before the operation of the radio communication apparatus in the wireless network is started, the receiving operation is performed for a predetermined redundant time in order to determine whether a desired wireless network exists.

Subsequently, it is determined in step S32 whether a beacon signal has been received in a desired wireless network. If a beacon signal (refer to FIG. 7) has been received, super frame period information is stored in step S33, and the next beacon signal receiving range is set in step S34.

Furthermore, it is determined in step S35 whether the receiving range of a beacon signal has arrived. If the receiving range has arrived, then the program returns to step S31 to repeatedly carry out the processing for receiving a beacon signal. In other words, the next beacon signal receiving timing is set from the super frame period information described in a received beacon signal.

If a beacon signal cannot be received, then a redundant time is set as a beacon receiving range in step S36, and the processing for receiving a beacon signal is repeated. It is further determined in step S37 whether a collision of beacon signals has been detected. In the case of the UWB radio data transmission system, no particular carriers exist; however, the collision can be detected by using a preamble signal.

If the collision of beacon signals between networks is detected, the interference information command is set in step S38. Upon arrival of an MTS range of a PNC in step S39, the command is transmitted in step S40. Thereafter, the program proceeds to step S35 described above.

If no collisions of beacon signals are detected in step S37, or if it is determined in step S39 that the MTS range has not arrived, then the program also proceeds to step S35, as described above.

If it is determined in step S35 that a beacon signal receiving range has not arrived, then it is further determined in step S41 whether an information receiving range has arrived.

If it is determined that the information receiving range has arrived, then the processing for receiving information is carried out in step S42 and it is further determined in step S43 whether data has been received.

If data has been received (refer to FIG. 10), then the program stores the data in the radio receiving buffer 66 in step S44, and notifies the interface 61 of the received data. Thereafter, the program proceeds to step S35 following the processing in step S39, and determines the arrival of the next beacon signal receiving range.

If it is determined in step S43 that no data has been received, then it is determined in step S45 whether a command has been received.

If a command has been received, then the command information is handed to the central controller 67 in step S46 to carry out processing based on the command. After that, if the arrival of an MTS is confirmed in step S39, then the program proceeds to command transmission processing in step S40.

If it is determined in step S45 that no command has been received, then it is determined in step S47 whether a beacon signal of another network has been received.

If a beacon signal of another network has been received, then the interference information command (refer to FIG. 8) is set in step S48. Thereafter, if the arrival of the MTS is confirmed in step S39, then the program proceeds to the processing for transmitting the command in step S40.

If it is determined in step S41 that the information receiving range has not arrived, then it is determined in step S49 whether the information to be wirelessly transmitted has been received from the interface 61 by the radio transmission buffer 62.

If the information to be wirelessly transmitted has been received, then it is determined in step S50 whether the timing permits data transmission. When the timing that permit data transmission arrives, then the processing for transmitting the data is carried out in step S51.

Even if no information to be wirelessly transmitted has been received, the program proceeds to step S39 thereafter to transmit a command at an MTS or to determine the arrival of the next beacon signal receiving range, and repeatedly carries out the series of processing steps described above.

The invention has been explained in detail with reference to a specific embodiment. It is obvious, however, that various modifications or changes of the disclosed embodiment can be made by persons skilled in the art within the spirit and scope of the present invention. In other words, the invention has been disclosed in terms of an embodiment, and the description of the present specification is not to be considered restrictive. Therefore, to appraise the scope of the invention, the following claims are made.

What is claimed is:

1. A radio communication apparatus operating as a control station of a given one of a plurality of wireless networks that co-exist, at least in part, in a common radio communication environment, the radio communication apparatus comprising:
   beacon transmitting means for setting a transmission frame period of the given wireless network and for transmitting, at a predetermined time within the transmission frame period, beacon information of the given wireless network regarding resource allocation thereof;
   interference detecting means for detecting whether the given wireless network interferes with another one of the plurality of wireless networks; and
   buffer frame period setting means for setting, upon detection of interference between the given wireless network and the another wireless network, a buffer frame period that is of different length than the transmission frame period to change the timing of the transmission frame period,
   wherein the interference detecting means detects interference of the beacon information of the given wireless network based on parameters obtained by receiving further beacon information from the another wireless network.

2. The radio communication apparatus according to claim 1, wherein the transmission frame period includes one or more contention free periods wherein data communication is effected based on at least one of reservation, allocation, or reservation and allocation, the interference detecting means detecting whether the one or more contention free periods are synchronized between the given wireless network and the another wireless network based on the parameters obtained by the receiving of the further beacon information.

3. The radio communication apparatus according to claim 2, wherein the buffer frame period setting means sets a buffer frame period that is shorter than the transmission frame period to ease the interference between the one or more contention free periods of the given wireless network and the another wireless network.

4. The radio communication apparatus according to claim 1, wherein the interference detecting means detects interference between the given wireless network and the another wireless network based on information received from a further radio communication apparatus in the given wireless network.

5. The radio communication apparatus according to claim 1, wherein the buffer frame period setting means sets a buffer frame period that is shorter than the transmission frame period to ease collision between transmission positions of beacon information of the given wireless network and the further beacon information of the another wireless network.

6. A radio communication method for a control station of a given one of a plurality of wireless networks that coexist, at least in part, in a common radio communication environment, the method comprising:
   a beacon transmission step for setting a transmission frame period of the given wireless network and for transmitting, at a predetermined time within the transmission frame period, beacon information of the given wireless network regarding resource allocation thereof;
   an interference detection step for detecting whether the given wireless network interferes with another one of the plurality of wireless networks; and
   a buffer frame period setting step for setting, upon detection of interference between the given wireless network and the another wireless network, a buffer frame period that is of different length than the transmission frame period to change a timing of the transmission frame period,
   wherein the interference detection step detects interference of the beacon information of the given wireless network based on parameters obtained by receiving further beacon information from the another wireless network.

7. The radio communication method according to claim 6, wherein the transmission frame period includes a contention free period wherein data communication is effected based on at least one of reservation, allocation, or reservation and allocation, and the interference detection step detects whether the one or more contention free periods are synchronized between the given wireless network and the another wireless network based on parameters obtained by receiving the further beacon information.

8. The radio communication method according to claim 7, wherein the buffer frame period setting step sets a buffer frame period that is shorter than the transmission frame period to ease the interference between the one or more contention free periods of the given wireless network and the another wireless network.

9. The radio communication method according to claim 6, wherein the interference detection step detects interference between the given wireless network and the another wireless network based on information received from a further radio communication apparatus in the given wireless network.

10. The radio communication method according to claim 9, wherein the buffer frame period setting step sets a buffer frame period that is shorter than the transmission frame period to ease collision between transmission positions of the beacon information of the given wireless network and further beacon information of the another wireless network.

11. A radio communication apparatus operating in at least one of a plurality of wireless networks that co-exist, at least in part, in a common radio communication environment, the radio communication apparatus comprising:
  beacon information receiving means for receiving first beacon information located in a predetermined beacon information receiving time interval from a first control station of a first one of the plurality of wireless networks;
  beacon information detecting means for detecting second beacon information from a second control station of a second one of the plurality of wireless networks;
  collision detecting means for detecting whether the first beacon information collides with the second beacon information; and
  interference informing means for notifying the first control station of the first network of a beacon information collision detection result,
  wherein the beacon information detecting means sets a predetermined time in the predetermined beacon information receiving time interval, to detect the second beacon information received from the second control station of the second network.

12. A radio communication apparatus operating in at least one of a plurality of wireless networks that co-exist, at least in part, in a common radio communication environment, the radio communication apparatus comprising:
  beacon information receiving means for receiving first beacon information located in a predetermined beacon information receiving time interval from a first control station of a first one of the plurality of wireless networks;
  beacon information detecting means for detecting second beacon information from a second control station of a second one of the plurality of wireless networks;
  collision detecting means for detecting whether the first beacon information collides with the second beacon information; and
  interference informing means for notifying the first control station of the first network of a beacon information collision detection result,
  wherein the interference informing means notifies the first control station of the first network of the beacon information collision detection result using a management time slot allocated to the first control station of the first network so that a succeeding superframe period is adjusted based on the notification.

13. A radio communication method carried out in a radio communication apparatus operating in at least one of a plurality of wireless networks that co-exist, at least in part, in a common radio communication environment, the method comprising:
  a beacon information receiving step for receiving first beacon information located in a predetermined beacon information receiving time interval from a first control station of a first one of the plurality of wireless networks;
  a beacon information detecting step for detecting second beacon information from a second control station of a second one of the plurality of wireless networks;
  a collision detecting step for detecting whether the first beacon information collides with the second beacon information; and
  an interference informing step for notifying the first control station of the first network of a beacon information collision detection result,
  wherein the beacon information detecting step sets a predetermined time in the predetermined beacon information receiving time interval, to detect the second beacon information received from the second control station of the second network.

14. A radio communication method carried out in a radio communication apparatus operating in at least one of a plurality of wireless networks that co-exist, at least in part, in a common radio communication environment, the method comprising:
  a beacon information receiving step for receiving first beacon information located in a predetermined beacon information receiving time interval from a first control station of a first one of the plurality of wireless networks;
  a beacon information detecting step for detecting second beacon information from a second control station of a second one of the plurality of wireless networks;
  a collision detecting step for detecting whether the first beacon information collides with the second beacon information; and
  an interference informing means for notifying the first control station of the first network of a beacon information collision detection result,
  wherein the interference informing step notifies the first control station of the first network of the beacon information collision detection result using a management time slot allocated to the first control station of the first network so that a succeeding superframe period is adjusted based on the notification.

15. A computer readable medium storing a computer program having instructions for carrying out a radio communication method in control station of a given one of a plurality of wireless networks that coexist, at least in part, in a common radio communication environment, the method comprising:
  setting a transmission frame period of the given wireless network and transmitting, at a predetermined time within the transmission frame period, beacon information of the given wireless network regarding resource allocation thereof;
  detecting whether the given wireless network interferes with another one of the plurality of wireless networks; and
  setting, upon detection of interference between the given wireless network and the another wireless network, a buffer frame period that is of different length than the transmission frame period to change a timing of the transmission frame period, wherein the detecting step detects interference of the beacon information of the given wireless network based on parameters obtained by receiving further beacon information from the another wireless network.

16. A computer readable medium storing a computer program having instructions for carrying out a radio communication method in a radio communication apparatus operating in at least one of a plurality of wireless networks that co-exist, at least in part, in a common radio communication environment, the method comprising:

receiving first beacon information located in a predetermined beacon information receiving time interval from a first control station of a first one of the plurality of wireless networks;

detecting means for detecting second beacon information from a second control station of a second one of the plurality of wireless networks;

detecting whether the first beacon information collides with the second beacon information; and notifying the first control station of the first network of a beacon information collision detection result, wherein the beacon information detecting means sets a predetermined time in the predetermined beacon information receiving time interval, to detect the second beacon information received from the second control station of the second network.

17. A radio communication system, comprising:

a plurality of wireless networks, each one of the plurality of wireless networks including an associated plurality of radio communication apparatuses and an associated control station, the associated control station being operable to allocate a resource to each associated radio communication apparatus of that wireless network in an associated transmission frame period and to transmit a beacon signal at a predetermined timing within the associated transmission frame period, wherein upon detection of interference between at least two of the plurality of wireless networks, a buffer frame period having a different length than the associated transmission frame period is set temporarily in one of the at least two wireless networks to prevent a collision between a first beacon signal transmitted by a first control station associated with the one of the at least two wireless networks and a second beacon signal transmitted by a second control station associated with another of the at least two wireless networks, the buffer frame period adjusting a length of an interval between the first beacon signal and the second beacon signal.

18. A radio communication system, comprising:

a plurality of wireless networks, each one the plurality of wireless networks including an associated plurality of radio communication apparatuses and an associated control station, the associated control station being operable to allocate a resource to each associated radio communication apparatus of that wireless network in an associated transmission frame period, the associated transmission frame period including a noncompetitive transmission field;

wherein upon detection of interference between at least two of the plurality of wireless networks, a buffer frame period having a different length than the associated transmission frame period is set temporarily in one of the at least two wireless networks to prevent competition between a first noncompetitive transmission field of a first transmission frame period associated with the one of the at least two wireless networks and a second non competitive transmission field of a second transmission frame period associated with another of the at least two wireless networks, the buffer frame period adjusting a positional relationship between a timing of the first transmission frame period and a timing of the second transmission frame period.

19. A computer readable medium storing a computer program having instructions for carrying out a radio communication method in a radio communication apparatus operating in at least one of a plurality of wireless networks that co-exist, at least in part, in a common radio communication environment, the method comprising:

a beacon information receiving step for receiving first beacon in formation located in a predetermined beacon information receiving time interval from a first control station of a first one of the plurality of wireless networks;

a beacon information detecting step for detecting second beacon information from a second control station of a second one of the plurality of wireless networks;

a collision detecting step for detecting whether the first beacon information collides with the second beacon information; and an interference informing step for notifying the first control station of the first network of a beacon information collision detection result, wherein the interference informing step notifies the first control station of the first network of the beacon information collision detection result using a management time slot allocated to the first control station of the first network so that a succeeding superframe period is adjusted based on the notification.

* * * * *